J. STEPHENSON.
Devices for Operating Street-Car Doors.

No. 147,192.                  Patented Feb. 3, 1874.

WITNESSES:
K. Newell
James H. Hunter

INVENTOR:
John Stephenson

UNITED STATES PATENT OFFICE.

JOHN STEPHENSON, OF NEW YORK, N. Y.

IMPROVEMENT IN DEVICES FOR OPERATING STREET-CAR DOORS.

Specification forming part of Letters Patent No. 147,192, dated February 3, 1874; application filed January 15, 1874.

*To all whom it may concern:*

Be it known that I, JOHN STEPHENSON, of the city of New York, have invented certain new and useful Improvements in Street-Cars; and declare the following to be a full, clear, and exact description thereof, reference being had to the drawings accompanying and forming a part of this specification.

This invention relates to a combination and arrangement of elements in a street-car by means of which the driver is enabled to open and shut the rear sliding door, without leaving his position, in a convenient manner. It consists of a single and continuous cord, attached by its two ends to the rear sliding door of a car, and arranged so as to pass through the hand-rails of the interior of the car, and over sheaves or pulleys situated opposite the ends of the respective hand-rails, to the driver's position.

Figure 1:
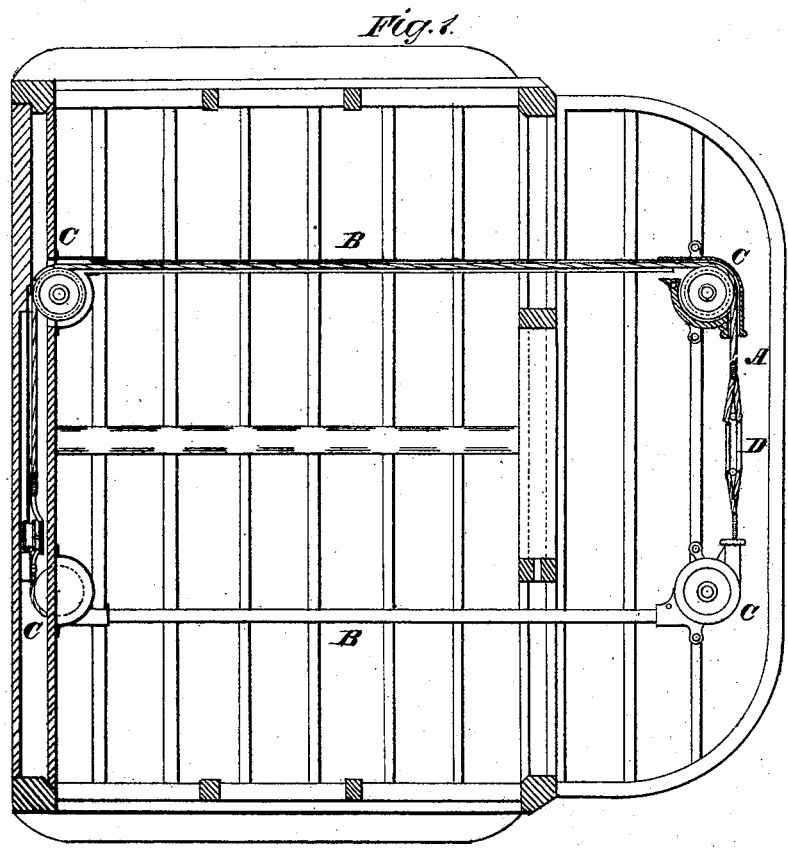
Figure 2:
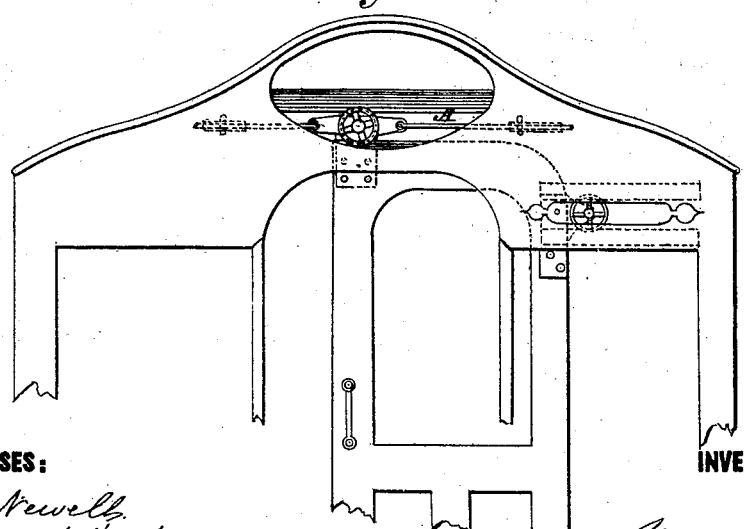

In the accompanying drawings, Figure 1 shows an arrangement of the elements of my invention in a car. Fig. 2 is a view of the single and continuous cord at its position in the car, where it is attached by its two ends to the car-door.

A is a single and continuous cord. B B are the hand-rails, through which such continuous cord is passed, and running to and from the driver's position on the front platform. C C C C are the angle-sheaves, each one placed opposite to one of the ends or entrances to the hand-rails in the car-body, and over which this continuous cord runs in passing into and out of the hand-rails. The rear sliding door is hung on sheaves and ways, in any known manner, and the ends of this continuous cord are attached to the upper portion of such door by being tied to the arms of a vertically-projecting iron, as shown in the drawings; or it may be attached in any other convenient manner.

In order to take up any slack of this continuous cord resulting from use, a link of rubber, or some equivalent element, may be placed in it.

The drawing shows a rubber ring, D, placed in the cord at the front end of the car.

I claim—

1. The combination of a sliding car-door with a single and continuous cord passing through the hand-rails of the interior of the car, and over sheaves or pulleys, substantially as described.

2. The combination of a sliding car-door, the single and continuous cord passing through the car, and the sheaves or pulleys, constructed as set forth, all substantially as and for the purpose described.

3. The combination of a sliding car-door, a single and continuous cord passing through the car, and a link of rubber for taking up the slack, substantially as described.

JOHN STEPHENSON.

Witnesses:
 K. NEWELL,
 JAMES H. HUNTER.